(12) United States Patent
Ramsden

(10) Patent No.: US 7,706,994 B2
(45) Date of Patent: Apr. 27, 2010

(54) SYSTEM AND METHOD FOR RATING THE NUTRITIONAL QUALITY OF FOOD ITEMS

(75) Inventor: Christopher Edward Ramsden, Chicago, IL (US)

(73) Assignee: Leona Ramsden, Dunwoody, GA (US)

( * ) Notice: Subject to any disclaimer, the term of this patent is extended or adjusted under 35 U.S.C. 154(b) by 12 days.

(21) Appl. No.: 12/105,352

(22) Filed: Apr. 18, 2008

(65) Prior Publication Data

US 2008/0262768 A1 Oct. 23, 2008

Related U.S. Application Data

(60) Provisional application No. 60/925,100, filed on Apr. 18, 2007.

(51) Int. Cl.
*G06F 19/00* (2006.01)

(52) U.S. Cl. ...................................................... 702/81

(58) Field of Classification Search .................... 702/81, 702/182; 426/75; 514/54
See application file for complete search history.

(56) References Cited

U.S. PATENT DOCUMENTS 7,183,266 B2 * 2/2007 Wolf et al. ..................... 514/54

* cited by examiner

*Primary Examiner*—Bryan Bui
(74) *Attorney, Agent, or Firm*—Sutherland Asbill & Brennan LLP

(57) ABSTRACT

The present application provides improved systems and methods for rating the nutritional quality of food. The method includes (a) determining the water free weight percentage of one or more macronutrients in the food item; (b) assigning a numerical influence factor to each of the macronutrients; (c) multiplying the water free weight percentage of each macronutrient by the influence factor of the macronutrient to calculate a nutrient and influence factor product for each macronutrient; and (d) summing the nutrient and influence factor products of the macronutrients to calculate a numerical rating for the food item.

14 Claims, 1 Drawing Sheet

SYSTEM AND METHOD FOR RATING THE NUTRITIONAL QUALITY OF FOOD ITEMS

CROSS-REFERENCE TO RELATED APPLICATIONS

The present application claims benefit of U.S. Provisional Application No. 60/925,100. The application is incorporated herein by reference.

TECHNICAL FIELD

The present application relates to rating systems and more particularly relates to systems and methods for rating the net nutritional quality of food items.

BACKGROUND OF THE INVENTION

Generally described, beneficial dietary choices may reduce chronic disease while improving longevity and quality of life. However, because the overall diet is determined by a series of individual selections, identification and habitual selection of high quality food items is a prerequisite for a healthy diet.

Conventional methods for selecting a healthy diet include the categorization of food items into a limited number of food "groups" and the listing of basic nutritional information, such as the "Nutrition Facts" panel required by the Nutrition Labeling and Education Act (NLEA) and Food and Drug Administration (FDA). Unfortunately, the categorization of foods is imprecise, since food items in the same food "group" may have widely divergent health properties. Furthermore, conventional nutritional information may be incomplete, misleading, difficult to understand, lacking uniformity due to dependence on serving size, and obscured and/or manipulated by neutral components such as water.

What is desired, therefore, is a method and system for more thoroughly and accurately evaluating and rating the nutritional quality of individual food items.

BRIEF DESCRIPTION OF THE INVENTION

The present application thus provides improved systems and methods for rating the nutritional quality of food. The method may include (a) determining the water free weight percentage of one or more macronutrients in the food item; (b) assigning a numerical influence factor to each of the macronutrients; (c) multiplying the water free weight percentage of each macronutrient by the influence factor of the macronutrient to calculate a nutrient and influence factor product for each macronutrient; and (d) summing the nutrient and influence factor products of the macronutrients to calculate a numerical rating for the food item. A system may include (a) at least one memory comprising (i) water free percentages of one or more macronutrients in a food item and (ii) numerical influence factors for each of the macronutrients; (b) a processor configured to (i) access the at least one memory to obtain the water free percentages of the one or more macronutrients in a food item; (ii) access the at least one memory to obtain numerical influence factors for each of the macronutrients; (iii) multiply the water free weight percentage of each macronutrient by the influence factor of the macronutrient to calculate a nutrient and influence factor product for each macronutrient; and (iv) sum the nutrient and influence factor products of the macronutrients to calculate a numerical rating for the food item.

These and other features of the present application will become apparent to one of ordinary skill in the art upon review of the following detailed description when taken in conjunction with the appended claims.

DETAILED DESCRIPTION OF THE INVENTION

Figure 1:
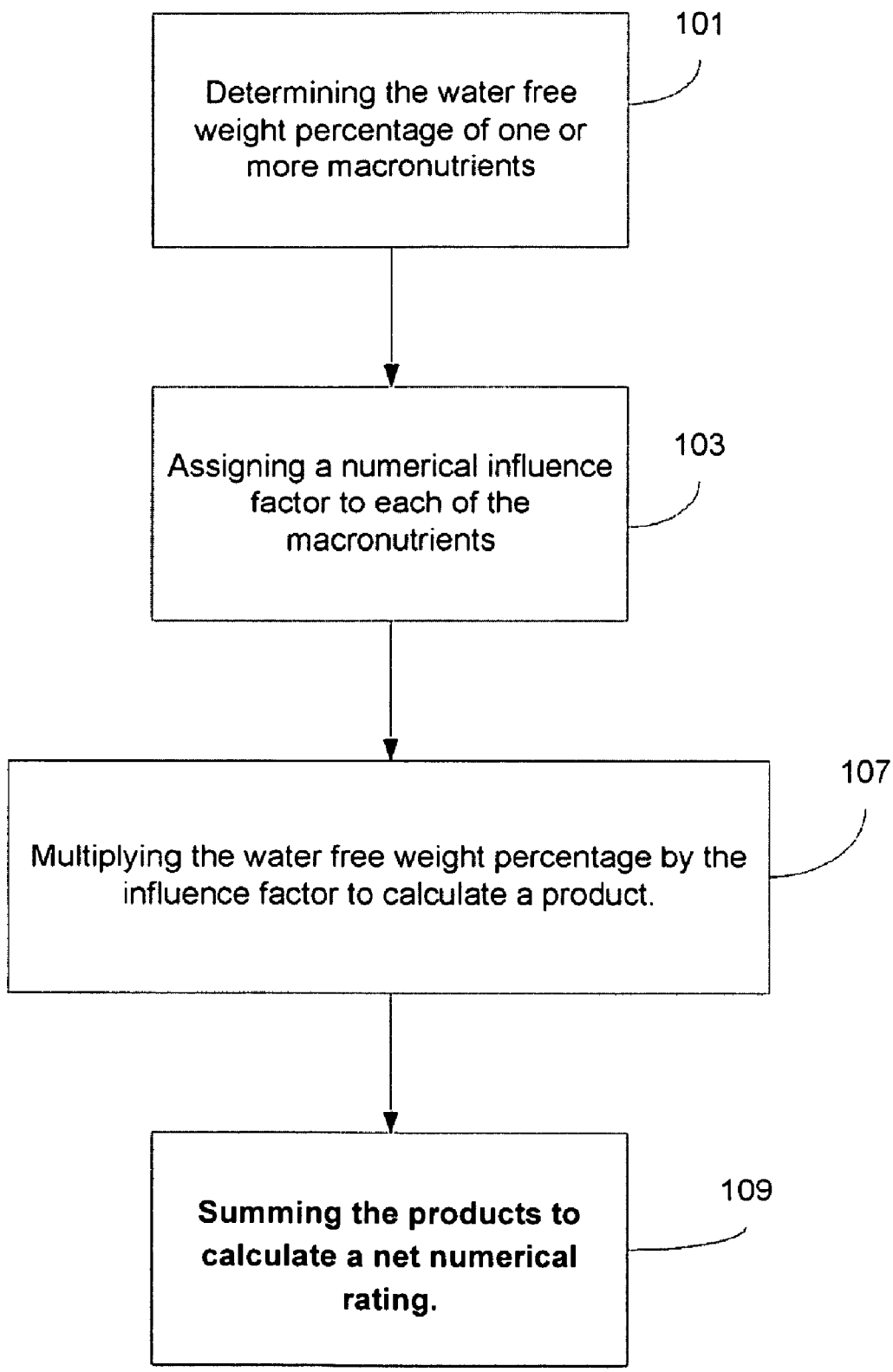
FIG. 1 is a flow chart illustrating one embodiment of a method of numerically rating nutritional quality.

The present application provides an improved method and system for rating the nutritional quality of food. It has now been discovered that multiplying the weight percentages of the nutrients within a food item by influence factors determined by the health properties of the nutrients may produce a set of products that, when summed, provide a numerical rating that reveals the overall nutritional quality of the food item. The method may depend on the comprehensive analysis of the molecular content of the individual food item, and balance the health properties of the most desirable and undesirable nutrients in accordance to the relative importance of their health impact. The method also may be independent (or not directly dependent) on serving size, non-nutrient ingredients, caloric value, and/or caloric density.

The nutritional quality rating may provide consumers with a tool for selecting food items that are beneficial for their health. Because the rating may be independent of water and other inactive or minimally active components, the health effects of different types of food may be directly compared. Furthermore, because features such as caloric value are considered alongside other health effects when determining the influence factors of the individual nutrients, the rating allows a variety of food items to be compared based on net health properties, rather than simply the total amount of calories provided in the item.

I. The Method

The methods described herein are useful in rating essentially any food item. Non-limiting examples of food items suitable for rating include natural food items, processed food items, dried food items, and beverages. In an embodiment, the method includes the steps of (a) determining the water free weight percentage of one or more macronutrients in a food item; (b) assigning a numerical influence factor to each of the macronutrients; (c) multiplying the water free weight percentage of each macronutrient by the influence factor of the macronutrient to calculate a nutrient and influence factor product for each macronutrient; and (d) summing the nutrient and influence factor products of the macronutrients to calculate a numerical rating for the food item.

A. Determining the Water Free Weight Percentage

The step of determining the water free weight percentage of the one or more macronutrients in the food item may be done using essentially any process known in the art. As used herein, the term "macronutrient" generally refers any substance that is consumed in relatively large quantities (generally over 100 mg/day). Non-limiting examples of macronutrients include saturated fats (SFA), monounsaturated fat (MUFA), linoleic acid (LA), alpha linoleic acid (ALA), arachidonic acid (ArA), eicosapentaenoic acid (EPA), docosahexanoic acid (DHA), cholesterol, non-fiber carbohydrates (NFC), fiber, protein, calcium, magnesium, sodium, and potassium. Further non-limiting examples of macronutrients may be found in Table 3 below.

In a particular embodiment, the step of determining the water free weight percentage of the one or more macronutrients in the food item includes locating the macronutrient content for a given weight of a food item in a database, subtracting the weight of the water from the given weight to determine the water free weight of the food item, and dividing the weight of each macronutrient contained in the food item by the water free weight. Databases suitable for use in determining the quantity of the one or more macronutrients in food items include the USDA Nutrient Data Laboratory (U.S. Department of Agriculture, Agricultural Research Service. 205. USDA Nutrient Database for Standard Reference, Release 18. Nutrient Data Laboratory. Home page, http://www.nal.usda.gov/fnic/foodcomp).

Alternatively, the water free weight percentage of the one or more macronutrients in the food item may be determined using the Nutrition Facts label and ingredients list provided on the food item. First, the water free weight of the food item may be determined by adding the listed weights of the total fat, cholesterol, sodium, total carbohydrate, and protein provided on the Nutrition Facts label. Next, the weights of the unlisted macronutrients may be estimated using the Nutrition Facts label, the ingredient list, and the knowledge of typical macronutrient profiles of the listed ingredients. For example, if the food item contains only one major source of fat, the typical fatty acid concentrations of the fat source may be multiplied by the total fat provided on the label to estimate the amounts of individual fatty acids in the food item. In the case of a cereal consisting solely of wheat and a sugar source with three listed grams of total fat, the amount of individual fatty acids in the cereal may calculated by multiplying the typical percentages of fatty acids in wheat (SFA 20%, MUFA 20%, LA 55%, ALA 5%) by total fat as follows:

$$0.20 \times 3g = 0.60g \text{ SFA}$$

$$0.20 \times 3g = 0.60g \text{ MUFA}$$

$$0.55 \times 3g = 1.65g \text{ LA}$$

$$0.05 \times 3g = 0.15g \text{ ALA}$$

The amounts of the individual fatty acids may then be divided by the water free weight of the cereal to determine the water free weight percentage of each fatty acid.

In the case of a food item that contains two or more major sources of fat, the fatty acid concentrations may be estimated based on the amount of fat contributed by each source and the typical fatty acid concentrations of each source. The amount of fat contributed by each source may be estimated based on (a) the weight percentage of fat found in each of the sources and (b) the order of the sources in the ingredient list. For example, sources that are listed earlier in the ingredient list are present in greater amounts in the food item than sources listed later in the ingredient list. Furthermore, any amount of a source that contains a high percentage of fat contributes more fat to the food item than the same amount of a source that contain a low percentage of fat. Thus, the order of the sources in the ingredient list and percentage of fat in each source may be used to estimate the amount of total fat in the food item provided by each source. The typical percentages of fatty acids in each fat source may then be multiplied by the estimated amount of total fat provided by the source to determine the amount of individual fatty acids in the food, and the amounts of the individual fatty acids may then be divided by the water free weight of the of the cereal to determine the water free weight percentage of each fatty acid. This method for estimating the weights of the unlisted macronutrients may be utilized to estimate carbohydrate profile as well as the fatty acid profile.

B. Determining the Numerical Influence Factor

Generally described, the numerical influence factors assigned to each of the macronutrients are (a) proportionate to the macronutrients' beneficial or deleterious effects on human health and (b) scaled so that multiplying the water-free weight percentages of the macronutrients within a food item by the influence factors may produce a set of products that, when summed, provide a numerical rating that falls within a range easily understood by consumers.

Non-limiting examples of the effects on human health considered when determining the influence factors include the effects on metabolic processes such as inflammation, blood clotting, cholesterol metabolism, fat accumulation, insulin metabolism, oxidative stress, and cellular proliferation. These and other metabolic pathways may play central regulatory roles in development of coronary heart disease, obesity, diabetes, alzheimer's dementia, arthritis, depression, cancer and many other diseases. In a particular embodiment, the method of determining the influence factor includes determining how the macronutrient affects the metabolic processes associated with disease, and using this information to determine the overall metabolic and health effects of the macronutrient. For example, the macronutrients effect on overall disease and health may be determined to be profoundly deleterious, moderately deleterious, neutral, moderately beneficial, profoundly beneficial or in between two of these overall effects. Sources of information suitable for use in determining the disease and health effects of macronutrients include experimental, epidemiological, mechanistic, animal model and other types of studies published in peer-reviewed medical journals.

In a particular embodiment, macronutrients with a deleterious effect on overall disease and health are assigned a negative influence factor, macronutrients with a beneficial effect on overall disease and health are assigned a positive influence factor, and macronutrients with a neutral effect on overall disease and health are assigned an influence factor of zero. The magnitude of the influence factor may be determined based on how deleterious or beneficial the macronutrient is to overall health, with more beneficial nutrients receiving the higher influence factors, and more deleterious nutrients receiving lower influence factors.

For example, the three omega-3 fatty acids, alpha-linolenic acid (ALA), eicosapentaenoic acid (EPA), and docosahexaenoic acid (DHA), have beneficial metabolic and health effects. However, the beneficial health effects of the longer-chain EPA and DHA are significantly more intense than beneficial effects of the short-chain ALA. Thus, in order to generate the most accurate net ratings of food items, EPA and DHA should be "weighted" more heavily, and assigned more positive influence factors than ALA, proportionate with their beneficial effects.

Similarly, saturated fats have widely recognized adverse effects on multiple metabolic pathways, and their consumption may raise the risk of developing coronary heart disease, diabetes and other diseases. However, evidence suggests that adverse consequences of trans fats are several magnitudes more intense than saturated fats, and that one a gram for gram basis, trans fats may raise the risk of heart disease up to fifteen times as much as saturated fats. Thus, in order to generate the most accurate ratings of food items, trans fats should be "weighted" more heavily, and assigned much more negative influence factor than saturated fats, proportionate with their adverse health effects.

In a particular embodiment, macronutrients that have distinctive health properties are assigned separate influence factors, and macronutrients that have similar health properties are grouped together. For example, saturated fats such as stearic, palmitic, myristic, and lauric acids appear to have equivalent health effects, and therefore may be assigned the same influence factor. Similarly, the major monounsaturated fats palmitoleic and oleic acid appear to have equivalent health properties, and can be assigned equivalent influence factors. Likewise, pure starches and sugars containing glucose and fructose appear to have equivalent health properties. Thus, they can be grouped into non-fiber carbohydrates and assigned a single influence factor. Should advances in nutritional sciences suggest that macronutrients grouped together have distinct impacts on health, each macronutrient within that group may be assigned a separate influence factor. For example, if the different amino acids grouped together as protein are suggested to have different health impacts, then theses molecules may each be assigned a separate influence factor.

Finally, the influence factor assigned to each macronutrient may be adjusted based on the amount of the macronutrient typically found in food items and the overall health properties of the macronutrient. For example, although both cholesterol and saturated fats appear to have deleterious health properties, cholesterol is present in foods in much smaller amounts than saturated fats, and may have more deleterious health properties by weight. For this reason, although dietary cholesterol may have a modest overall impact on health, it may be assigned more negative influence factor than saturated fat.

Table 1 below provides non-limiting examples of the overall disease and health effects and assigned influence factors of several macronutrients. One of ordinary skill in the art would recognize that individual nutrients or nutrient subsets within the groups set forth below may have distinct net health effects and be used to supplement or amend this table.

TABLE 1

Health Effects and Influence Factors of Macronutrients

| Nutrient (or molecular) Category | Metabolic and Health Effects | Influence Factor |
| --- | --- | --- |
| Saturated fat | Moderately deleterious | −0.24 |
| Monounsaturated fat | Modestly beneficial | +0.12 |
| Linoleic acid | Modestly deleterious | −0.18 |
| Arachidonic acid | Profoundly deleterious | −4.00 |
| Alpha-linolenic acid | Moderately beneficial | +0.80 |
| Eicosapentaenoic and Docosahexaenoic acids | Profoundly beneficial Profoundly beneficial | +3.00 +3.00 |
| Trans fats | Profoundly deleterious | −4.00 |
| Cholesterol | Modestly deleterious | −0.50 |
| Non-fiber carbohydrates | Modestly deleterious | −0.07 |
| Fiber | Moderately beneficial | +0.40 |
| Protein | Modestly beneficial | +0.07 |
| Sodium | Moderately deleterious | −0.50 |
| Magnesium | Moderately beneficial | +0.50 |
| Calcium | Moderately beneficial | +0.50 |
| Potassium | Modestly beneficial | +0.25 |

C. Providing the Numerical Rating

The influence factors and water free weight percentages may be used to calculate a numerical rating for the food item. In a particular embodiment, the rating is calculated by multiplying the water free weight percentage of each macronutrient by the influence factor of the macronutrient to calculate a nutrient and influence factor product for each macronutrient, and summing the nutrient and influence factor products of the macronutrients to calculate a numerical rating for the food item.

The influence factors may be weighted so that the sum of the nutrient and influence factor products is within any range that may be easily understood by customers. In a preferred embodiment, the influence factors are weighted so that the sum of the nutrient and influence factor products is between −10 and +10. In another embodiment, the influence factors are weighted so that the sum of the nutrient and influence factor products is between −100 and +100. Further non-limiting examples of scales suitable for use include −5 to +5, 0 to 10, 0 to 100, 0 to 1000, and −1000 to +1000. After the numerical rating is calculated, it may be rounded.

The numerical food rating may allow customers to quickly identify the overall health impact of the food item. For example, if the influence factors are weighted so that the sum of the nutrient and influence factor products is between −10 and +10, then customers may recognize that −10 signifies a food item with profoundly deleterious health properties, 0 signifies a food item with neutral health attributes, and +10 signifies a food item with profoundly beneficial health properties.

D. Adjusting the Numerical Rating

The numerical rating may be adjusted to provide a more accurate rating of the health properties of the food item.

In a particular embodiment, one or more of the nutrient and influence factor products may be capped to ensure that high concentrations of particular nutrients do not have too large an influence over the overall rating. For example, a maximum value cap may be assigned to the nutrient and influence factor for each micronutrient, and the value of any nutrient and influence factors that are above the maximum cap may be reduced to the maximum value cap. Likewise, a minimum value cap may be assigned to the nutrient and influence factor for each micronutrient, and the value of any nutrient and influence factors that are less than the minimum cap may be increased to the minimum value cap. In another embodiment, the nutrient and influence factors may be capped at an absolute value, so that no nutrient and influence factor may raise or lower the numerical rating by more than a predetermined amount.

In another embodiment, the numerical influence factor assigned to at least one of the macronutrients is dependent on the water free weight percentage of the macronutrient in the food item. For example, if a given nutrient has a specific range in which it has particular effects on health, the numerical influence factor assigned to that nutrient may depend on whether the water free percentage of that nutrient is within the specific range. Similarly, if a given nutrient has a particular level or value at which its effects on health become pronounced, the numerical influence factor assigned to that nutrient may depend on whether the water free percentage of that nutrient is above the particular level or value.

In yet another embodiment, the numerical influence factor assigned to at least one of the macronutrients is dependent on the ratio of water free weight percentage of the at least one macronutrient to the water free weight percentage of another macronutrient. For example, if the ratio of the macronutrients has a specific range in which it has particular effects on health, the numerical influence factor assigned to that nutrient may depend on whether the ratio is within the specific range. Similarly, if the ratio has a particular level or value at which its effects on health become pronounced, the numerical influence factor assigned to that nutrient may depend on whether the ratio is above the particular level or value.

The numerical rating of the food item also may be adjusted based on the level of antioxidants in the food item. In a particular embodiment, the rating is adjusted based on the total antioxidant capacity (TAC) of the food item. The adjustment may comprise calculating the TAC per gram of water free weight of the food item, and adding the value to the numerical rating of the food item. Alternatively, the adjustment may comprise calculating the TAC per gram of water free weight of the food item, multiplying the value by an influence factor to obtain a product, and adding this product to the numerical rating of the food item. Sources for obtaining the TAC for food items are well-known to those of ordinary skill in the art.

The numerical rating of the food item also may be adjusted based on the level of toxins in the food item. In a particular embodiment, the rating is adjusted based on the level of mercury in the food item. The adjustment may comprise calculating the level of mercury in the food item in parts per million (ppm), multiplying this number by an influence factor, and adding the value to the numerical rating of the food item. In a preferred embodiment, the influence factor is −15. Non-limiting examples of other toxins suitable for adjusting the numerical rating with include lead and aluminum. Sources for obtaining the level of toxins found in food items are well-known to those of ordinary skill in the art.

The numerical rating of the food item also may be adjusted based on the level of micronutrients in the food item. As used herein, the term "micronutrient" generally refers any substance that is consumed in relatively low quantities (generally less than 200 mg/day). Non-limiting examples of micronutrients may be found in Table 3 below.

In a particular embodiment, the rating is adjusted by determining the percentage of a recommended quantity of one or more micronutrients in a specific amount of the food item; assigning a fraction of the recommended quantity for each micronutrient; assigning an adjustment factor for each micronutrient; dividing the percentage of the recommended quantity by the fraction of the recommend quantity to calculate a value for each micronutrient multiplying the value of each micronutrient by the adjustment factor of the micronutrient to calculate a nutrient and adjustment factor product for each micronutrient; and summing the nutrient and adjustment factor products of the micronutrients with the numerical rating for the food item to calculate an adjusted numerical rating for the food item.

The recommended quantity of the micronutrients may comprise the Recommended Daily Allowance (RDA) of the micronutrient, the Dietary Reference Intake (DRI) of the micronutrient, or any other quantity of the micronutrient suitable for consumption in a healthy diet.

The specific amount of the food item may comprise one serving size of the food item. Alternatively, the specific amount of the food item may comprise a specific amount of water free weight of the food item. In a particular embodiment, the specific amount of the food item may comprise 30 grams of water-free weight of the food item.

The fraction of the recommended quantity for each micronutrient may comprise any fraction of the recommended quantity suitable for consumption in a food item of a healthy diet. In one embodiment, the fraction of the recommended quantity is a fraction in the range of about 5% to about 80%. In a particular embodiment, the fraction of the recommended quantity is 20%.

The amount of micronutrient in the food item may be determined using a database. Alternatively, the amount of micronutrient in the food item may be determined using the Nutrition Facts label and/or ingredients list provided on the food item.

In a particular embodiment, one or more of the nutrient and adjustment factor products may be capped to ensure that high concentrations of particular micronutrients do not have too large an influence over the overall rating. For example, a maximum value cap may be assigned to the nutrient and adjustment factor for each micronutrient. If the deficiency of the micronutrient is commonly known to cause health problems, the cap assigned to the micronutrient may be relatively high. For example, deficiencies in Vitamin D and folate are quite common, so the cap for these micronutrients may be relatively high as compared to the cap for other micronutrients. In a particular embodiment, the maximum value cap is equal to the adjustment factor.

Table 2 below provides non-limiting examples of the fraction of the recommended quantity and the adjustment factors of several micronutrients. One of ordinary skill in the art would recognize that individual micronutrients or micronutrient subsets within the groups set forth below may have distinct net health effects and be used to supplement or amend this table. Should advances in nutritional sciences suggest that micronutrients grouped together in Vitamin E or Vitamin D have distinct impacts on health, each micronutrient within that group may be assigned a separate influence factor.

TABLE 2

Recommended Quantities, Fraction of Recommended Quantities, and Adjustment Factors of Macronutrients

| Micronutrient | Recommended Quantity | Fraction of Recommended Quantity | Adjustment Factor |
| --- | --- | --- | --- |
| Thiamin (B1) | 1.1 mg | 0.2 | .10 |
| Riboflavin (B2) | 1.1 mg | 0.2 | .10 |
| Niacin | 14 mg | 0.2 | .10 |
| Pantothenic acid | 5 mg | 0.2 | .10 |
| Pyridoxine (B6) | 1.3 mg | 0.2 | .10 |
| Cyanocobalamine | 2.4 mg | 0.2 | .10 |
| Choline | 425 mg | 0.2 | .10 |
| Vitamin A | 800 Retinol Equivalents (RE) | 0.2 | .10 |
| Vitamin E | 8 mg | 0.2 | .10 |
| Vitamin K | 65 mcg | 0.2 | .10 |
| Vitamin C | 45 mg | 0.2 | .10 |
| Iron | 10 mg | 0.2 | .10 |
| Phosphorus | 700 mg | 0.2 | .10 |
| Iodine | 150 mg | 0.2 | .10 |
| Zinc | 12 mg | 0.2 | .10 |
| Copper | 1.5 mg | 0.2 | .10 |
| Manganese | 2 mg | 0.2 | .10 |
| Selenium | 55 mcg | 0.2 | .10 |
| Vitamin D | 400 IU | 0.2 | 1.00 |
| Folate | 400 mcg | 0.2 | 0.50 |

E. Ranking with Bioactive Nutrients

Also provided in the present application is a method of rating the nutritional quality of a food item based one or more bioactive nutrients in the food item As used herein, the term "bioactive nutrient" generally refers to any substance that has a beneficial or adverse effect on overall health. Non-limiting examples of bioactive nutrients include macronutrients, micronutrients, and toxins. Non-limiting examples of specific bioactive nutrients may be found in Table 3 below.

In one embodiment, the method includes: (a) determining the water free weight percentage of one or more bioactive nutrients in the food item; (b) assigning a numerical influence factor to each of the bioactive nutrients; (c) multiplying the water free weight percentage of each bioactive nutrient by the influence factor of the bioactive nutrient to calculate a nutrient and influence factor product for each bioactive nutrient, and (d) summing the nutrient and influence factor products of the bioactive nutrients to calculate a numerical rating for the food item.

TABLE 3

Non-limiting Examples of Nutrients Suitable for Use in the Present Invention

| Macronutrients | Micronutrients |
| --- | --- |
| Saturated fats | Minerals |
|     Butyric acid |     Sodium |
|     Caproic acid |     Potassium |
|     Caprylic acid |     Calcium |
|     Capric acid |     Magnesium |
|     Lauric acid |     Selenium |
|     Myristic acid |     Iron |
|     Palmitic acid |     Phosphorus |
|     Stearic acid |     Zinc |
|     Arachidic acid |     Copper |
|     Behenic acid |     Vanadium |
| Monounsaturated fats |     Chromium |
|     Myristoleic acid |     Manganese |
|     Palmitoleic acid |     Iodine |
|     Oleic acid | Mineral Toxins |
|     Gadoleic acid |     Mercury |
|     Erucic acid |     Lead |
| Omega-6 Polyunsaturated fats |     Aluminum |
|     Linoleic acid | Vitamins |
|     Gamma-linolenic acid |     Thiamin |
|     Dihomo-gamma-linolenic acid |     Riboflavin |
|     Arachidonic acid |     Niacin |
|     Docosapentaenoic acid |     Pyridoxine |
| Other |     Pantothenic acid |
|     Omega-3 Polyunsaturated fats |     Folate |
|     Alpha-linolenic acid |     Biotin |
|     Eicosapentaenoic acid |     Cobalamin |
|     Docosahexaenoic acid |     Ascorbic acid |
| Trans Fatty Acids |     Vitamin K |
|     Trans-hexadecenoic acid |     Vitamin D2, D3 |
|     Trans-octadecennoic acid (elaidic) |     Vitamin E |
|     Trans-octadecadienoic acid (linolelaidic) |     Vitamin A |
|     Other trans | Other vitamins |
| Cholesterol |     Phytonutrients |
| Glycerol |     Polyphenolic antioxidants (alternatively, can separate) |
| Total Carbohydrates | Total antioxidant capacity (ORAC, etc) |
| Insoluble fiber | Phytosterols |
| Soluble fiber | Carotenoids |
| Starch (amylase and amylopectin) | Artificial sweeteners |
| Total Sugar |     Acesulfame, Aspartame |
|     Glucose |     Saccharin |
|     Fructose |     Sucralose |
|     Galactose | Miscellaneous |
|     Sucrose |     Polychlorinated biphenyls (PCBs) |
|     Maltose |     Nitrosamines |
|     Lactose |     Water |
| Glycemic index |     Choline |
| Glycemic load |     Sugar alcohols |
| Total Protein (alternatively, can break down by individual amino acids) | |

II. The System

The systems described herein are useful in rating essentially any food item. In a preferred embodiment, the system includes (a) at least one memory comprising (i) water free percentages of one or more macronutrients in a food item and (ii) numerical influence factors for each of the macronutrients; (b) a processor configured to (i) access the at least one memory to obtain the water free percentages of the one or more macronutrients in a food item; (ii) access the at least one memory to obtain numerical influence factors for each of the macronutrients; (iii) multiply the water free weight percentage of each macronutrient by the influence factor of the macronutrient to calculate a nutrient and influence factor product for each macronutrient; and (iv) sum the nutrient and influence factor products of the macronutrients to calculate a numerical rating for the food item. Suitable memory and processors are well-know to those of ordinary skill in the art.

The system may further include a display for generating an image of the numerical rating for the food item. The system also may include an input device adapted to receive input from a user regarding the food item to be rated. Suitable displays and input devices are well know to those of ordinary skill in the art. Non-limiting examples of suitable input devices include a mouse, a keyboard, and a bar-code scanner.

Also provided in the present application is a computer-readable medium having stored thereon computer-executable instructions for performing the methods of the present invention. Suitable mediums for storing computer-executable instructions are well know to those of ordinary skill in the art. Non-limiting examples of suitable mediums include a floppy disk, a CD, a DVD, a hard drive disk, a RAM disk, a USB Thumb drive, and a MiniDisc.

In another embodiment, the system includes (a) at least one memory comprising (i) water free percentages of one or more bioactive nutrients in a food item and (ii) numerical influence factors for each of the bioactive nutrients; (b) a processor configured to (i) access the at least one memory to obtain the water free percentages of the one or more bioactive nutrients in a food item; (ii) access the at least one memory to obtain numerical influence factors for each of the bioactive nutrients; (iii) multiply the water free weight percentage of each bioactive nutrient by the influence factor of the bioactive nutrient to calculate a nutrient and influence factor product for each bioactive nutrient; and (iv) sum the nutrient and influence factor products of the bioactive nutrients to calculate a numerical rating for the food item.

The present invention is further illustrated by the following examples, which are not to be construed in any way as imposing limitations upon the scope thereof. On the contrary, it is to be clearly understood that resort may be had to various other embodiments, modifications, and equivalents thereof which, after reading the description therein, may suggest themselves to those skilled in the art without departing from the spirit of the present invention and/or the scope of the appended claims.

Example 1

Rating the Nutritional Quality of a Walnut

The nutritional quality of a walnut was determined using the macronutrient content of 100 grams of walnuts. The macronutrient content was determined to be as follows:

Total weight=100 grams
Water weight=6.0 grams
Saturated fats (SFA)=6.4 grams
Monounsaturated fat (MUFA)=9.4 grams
Linoleic acid (LA)=39.9 grams
Alpha Linoleic acid (ALA)=9.5 grams
Fiber=6.7 grains
Non-fiber carbohydrates (NFC)=7.0 grams
Protein=15.1 grams The water free weight percentage of the macronutrients was determined by subtracting the weight of the water from the total weight as follows:

100g−6g=94g of water-free weight

Next, the respective weight of each macronutrient is divided by the water free weight (94 grams) to determine the percentage of water free weight due to each macronutrient:

| | Nutrient | | | | | | |
|---|---|---|---|---|---|---|---|
| | SFA | MUFA | LA | ALA | Fiber | NFC | Protein |
| Weight % | 6.8% | 10.0% | 42.4% | 10.1% | 7.1% | 7.4% | 16.1% |

Next, the numerical influence factors were assigned to each of the macronutrients as follows:

| SFA | Z | −0.24 |
|---|---|---|
| MUFA | Y | +.12 |
| LA | X | −.18 |
| ALA | W | +.80 |
| Fiber | V | +.40 |
| NFC | U | −.07 |
| Protein | T | +.07 |

Next, the water free weight percentage of each macronutrient was multiplied the influence factor, and the nutrient and influence factor products were summed to calculate a numerical rating as follows:

$$6.8Z+10Y+42.4X+10.1W+7.1V+7.4U+16.1T=\text{score} \quad (1)$$

$$(6.8\times-0.24)+(10\times0.12)+(42.4\times-0.18)+(10.1\times0.80)+ \\ (7.1\times0.40)+(7.4\times-0.07)+(16.1\times0.07)=\text{score} \quad (2)$$

$$(-1.632)+(1.2)+(-7.632)+(8.08)+(2.84)+(-0.518)+ \\ (1.127)=\text{score} \quad (3)$$

$$3.465=\text{score} \quad (4)$$

Optionally, the numerical rating of 3.465 may be rounded. Furthermore, the numerical rating may be adjusted by capping the nutrient and influence factor products at an absolute valued of 5. With this cap, calculation of the adjusted rating is as follows:

$$(-1.632)+(1.2)+(-7.632)+(8.08)+(2.84)+(-0.518)+ \\ (1.127)=\text{score} \quad (1)$$

$$(-1.632)+(1.2)+(-5)+(5)+(2.84)+(-0.518)+ \\ (1.127)=\text{adjusted score} \quad (2)$$

$$3.017=\text{adjusted score} \quad (3)$$

Example 2

Rating the Nutritional Quality of Yellowfin Tuna

The nutritional quality of yellowfin tuna was determined using the macronutrient content of 100 grams of tuna. The macronutrient content, influence factor, and nutrient and influence factor products were determined to be as follows:

| Nutrient | Weight (grams) | Percentage water-free weight | Influence factor | Nutrient and Influence Factor Product |
|---|---|---|---|---|
| SFA | .235 | 0.95% | −.24 | −.23 |
| MUFA | .154 | 0.62 | +.12 | +.07 |
| LA | .008 | 0.03 | −.18 | −.01 |
| ArA | .028 | 0.11 | −4.0 | −.44 |
| ALA | .012 | 0.05 | +.80 | +.04 |
| EPA | .037 | 0.15 | +3.0 | +.45 |
| DHA | .181 | 0.73 | +3.0 | +2.19 |
| Cholesterol | .045 | 0.18 | −.50 | −.09 |
| NFC | 0 | 0 | −.07 | 0 |
| Fiber | 0 | 0 | +.40 | 0 |
| Protein | 23.4 | 95.51 | +.07 | +6.69 |
| Calcium | .016 | .06 | +.50 | +.04 |
| Magnesium | .050 | .20 | +.50 | +.10 |
| Sodium | .037 | .15 | −.50 | −.08 |
| Potassium | .444 | 1.80 | +.25 | +.45 |
| Total | 24.65 | | | +9.15 (Score) |

Next, the numerical rating was adjusted based on the level of mercury in the tuna. The average ppm of mercury in tuna of 0.34 was multiplied by the numerical influence factor of −15 and the total was subtracted from the rating:

$$(0.34\text{ppm}\times-15)+9.15=-5.1+9.15=4.05 \text{ rating.}$$

Next, the numerical rating was further adjusted based on the level of micronutrient in 30 water-free grams of Tuna. The micronutrient content, influence factor, and nutrient and adjustment factor products were determined to be as follows:

| Micronutrient | Quantity per 100 gram sample | Quantity per 30 grams water-free weight | Nutrient and Adjustment Factor Product (based on % of recommended quantity and adjustment factor) |
|---|---|---|---|
| Vitamin D | 200 IU** (estimate) | 244 IU | 0.610 |
| Folate | 2 mcg | 2.44 mcg | 0.003 |
| Thiamin (B1) | 0.434 mg | 0.530 mg | .100 |
| Riboflavin (B2) | 0.047 mg | 0.057 mg | .026 |
| Niacin | 9.800 mg | 11.956 mg | .100 |
| Pantothenic acid | 0.750 mg | 0.915 mg | .092 |
| Pyridoxine (B6) | 0.900 mg | 1.098 mg | .100 |
| Cyanocobalamine | 0.520 mg | 0.634 mg | .100 |
| Choline | 65 mg | 79.300 mg | .093 |
| Vitamin A | 18 RE | 21.960 RE | .014 |
| Vitamin E | 0.50 mg | 0.610 mg | .038 |
| Vitamin K | 0.1 mcg | 0.122 mcg | 0.0 |
| Vitamin C | 1.0 mg | 1.22 mg | .014 |
| Iron | 0.73 mg | 0.891 mg | .045 |
| Phosphorus | 191 mg | 233.0 mg | .100 |
| Iodine | 20 mg (estimate) | 24.4 mg | .100 |
| Zinc | 0.520 mg | 0.634 mg | .026 |
| Copper | 0.064 mg | 0.078 mg | .026 |
| Manganese | 0.015 mg | 0.003 mcg | .001 |
| Selenium | 36.5 mcg | 44.5 mcg | .100 |
| | | | Total = +1.688 |

The adjusted numerical ranking was thus calculated to be 4.05+1.688=5.74 adjusted rating.

It should be understood that the foregoing relates only to the preferred embodiments of the present application and that numerous changes and modifications may be made herein without departing from the general spirit and scope of the invention as defined by the following claims and the equivalents thereof.

I claim:

1. A computer readable medium having a program stored thereon for executing a computer to perform a method of rating the nutritional quality of a food item, comprising the steps:
   (a) receiving an input regarding the food item;
   (b) determining a water free weight percentage of one or more macronutrients in the food item;
   (c) assigning a numerical influence factor to each of the macronutrients;
   (d) multiplying the water free weight percentage of each macronutrient by the influence factor of the macronutrient to calculate a nutrient and influence factor product for each macronutrient; and
   (e) summing the nutrient and influence factor products of the macronutrients to calculate a numerical rating for the food item.

2. The computer readable medium of claim 1, wherein the program is further configured to execute the computer to perform the steps of:
   assigning a maximum value cap to the nutrient and influence factor product for each macronutrient; and
   after step (d) and before step (e), reducing the value of any nutrient and influence factor product that is greater than the maximum value cap to the maximum value cap.

3. The computer readable medium of claim 1, wherein the program is further configured to execute the computer to perform the steps of:
   assigning a minimum value cap to the nutrient and influence factor product for each macronutrient; and
   after step (d) and before step (e), increasing the value of any nutrient and influence factor product that is less than the maximum value cap to the minimum value cap.

4. The computer readable medium of claim 1, wherein the program is further configured to execute the computer to perform the steps of:
   assigning a maximum value cap to the nutrient and influence factor product for each macronutrient;
   assigning a minimum value cap to the nutrient and influence factor product for each macronutrient; and
   after step (d) and before step (e), reducing the value of any nutrient and influence factor product that is greater than the maximum value cap to the maximum value cap, and increasing the value of any nutrient and influence factor product that is less than the maximum value cap to the minimum value cap.

5. The computer readable medium of claim 1, wherein the numerical influence factor assigned to at least one of the macronutrients is dependent on the water free weight percentage of the macronutrient.

6. The computer readable medium of claim 1, wherein the numerical influence factor assigned to the at least one macronutrient is dependent on whether the water free weight percentage of the at least one macronutrient is above a specific value.

7. The computer readable medium of claim 1, wherein the numerical influence factor assigned to the at least one macronutrient is dependent on whether the water free weight percentage of the at least one macronutrient is within one or more specific ranges.

8. The computer readable medium of claim 1, wherein the numerical influence factor assigned to at least one of the macronutrients is dependent on the ratio of the water free weight percentage of the at least one macronutrient to the water free weight percentage of another macronutrient.

9. The computer readable medium of claim 1, wherein the program is further configured to execute the computer to perform the steps of:

determining the percentage of a recommended quantity of one or more micronutrients in a specific amount of the food item;

assigning a fraction of the recommended quantity for each micronutrient;

assigning an adjustment factor for each micronutrient;

dividing the percentage of the recommended quantity by the fraction of the recommended quantity to calculate a value for each micronutrient;

multiplying the value of each micronutrient by the adjustment factor of the micronutrient to calculate a nutrient and adjustment factor product for each micronutrient; and summing the nutrient and adjustment factor products of the micronutrients with the numerical rating for the food item to calculate an adjusted numerical rating for the food item.

10. The computer readable medium claim 1, wherein the program is further configured to execute the computer to perform the steps of:

determining the percentage of one or more toxins in the food item;

assigning a numerical influence factor to each of the toxins;

multiplying the percentage of each toxin by the influence factor of the toxin to calculate a nutrient and influence factor product for each toxin; and summing the nutrient and influence factor products of the toxins with the numerical rating for the food item to calculate an adjusted numerical rating for the food item.

11. A computer-implemented method of rating the nutritional quality of a food item, comprising the steps:

providing a computer having a computer readable medium and a program stored thereon for executing the computer to calculate a numerical rating for the food item;

inputting an input regarding the food item into the computer; and using the computer to calculate the numerical rating for the food item by using the program to execute the computer to determine a water free weight percentage of one or more bioactive nutrients in the food item; to assign a numerical influence factor to each of the bioactive nutrients; to multiply the water free weight percentage of each bioactive nutrient by the influence factor of the bioactive nutrient to calculate a nutrient and influence factor product for each bioactive nutrient and to sum the nutrient and influence factor products of the bioactive nutrients to calculate the numerical rating for the food item.

12. The method of claim 11, wherein the bioactive nutrients comprise macronutrients, micronutrients, toxins, or a combination thereof.

13. A system for rating the nutritional quality of a food item, comprising:

(a) an input device adapted to receive input from a user regarding the food item;

(b) at least one memory comprising (i) water free percentages of one or more macronutrients in a food item and (ii) numerical influence factors for each of the macronutrients;

(c) a processor configured to (i) access the at least one memory to obtain the water free percentages of the one or more macronutrients in a food item; (ii) access the at least one memory to obtain numerical influence factors for each of the macronutrients; (iii) multiply the water free weight percentage of each macronutrient by the influence factor of the macronutrient to calculate a nutrient and influence factor product for each macronutrient; and (iv) sum the nutrient and influence factor products of the macronutrients to calculate a numerical rating for the food item.

14. The system of claim 13, further comprising:

a display for generating an image of the numerical rating for the food item.

* * * * *